Oct. 28, 1958 D. W. KOHS 2,858,530

CONVERSION OF BINARY CODE TO REFLECTED CODE

Original Filed Nov. 5, 1953 3 Sheets-Sheet 1

INVENTOR
D. W. KOHS
BY Harry C. Hart
ATTORNEY

Oct. 28, 1958 D. W. KOHS 2,858,530

CONVERSION OF BINARY CODE TO REFLECTED CODE

Original Filed Nov. 5, 1953 3 Sheets-Sheet 2

INVENTOR
D. W. KOHS
BY Harry C. Hart
ATTORNEY

FIG. 6

RELATED FORMS OF THE FIVE DIGIT TWO VALUED CODE

| | I REFLECTED | II BINARY | III | IV | V | VI | VII | VIII | I REFLECTED |
|---|---|---|---|---|---|---|---|---|---|
| 0 | 00000 | 00000 | 00000 | 00000 | 00000 | 00000 | 00000 | 00000 | 00000 |
| 1 | 00001 | 00001 | 00001 | 00001 | 00001 | 00001 | 00001 | 00001 | 00001 |
| 2 | 00011 | 00010 | 00011 | 00010 | 00011 | 00010 | 00011 | 00010 | 00011 |
| 3 | 00010 | 00011 | 00010 | 00011 | 00010 | 00011 | 00010 | 00011 | 00010 |
| 4 | 00110 | 00100 | 00111 | 00101 | 00110 | 00100 | 00111 | 00101 | 00110 |
| 5 | 00111 | 00101 | 00110 | 00100 | 00111 | 00101 | 00110 | 00100 | 00111 |
| 6 | 00101 | 00110 | 00100 | 00111 | 00101 | 00110 | 00100 | 00111 | 00101 |
| 7 | 00100 | 00111 | 00101 | 00110 | 00100 | 00111 | 00101 | 00110 | 00100 |
| 8 | 01100 | 01000 | 01111 | 01010 | 01100 | 01000 | 01111 | 01010 | 01100 |
| 9 | 01101 | 01001 | 01110 | 01011 | 01101 | 01001 | 01110 | 01011 | 01101 |
| 10 | 01111 | 01010 | 01100 | 01000 | 01111 | 01010 | 01100 | 01000 | 01111 |
| 11 | 01110 | 01011 | 01101 | 01001 | 01110 | 01011 | 01101 | 01001 | 01110 |
| 12 | 01010 | 01100 | 01000 | 01111 | 01010 | 01100 | 01000 | 01111 | 01010 |
| 13 | 01011 | 01101 | 01001 | 01110 | 01011 | 01101 | 01001 | 01110 | 01011 |
| 14 | 01001 | 01110 | 01011 | 01101 | 01001 | 01110 | 01011 | 01101 | 01001 |
| 15 | 01000 | 01111 | 01010 | 01100 | 01000 | 01111 | 01010 | 01100 | 01000 |
| 16 | 11000 | 10000 | 11111 | 10101 | 11001 | 10001 | 11110 | 10100 | 11000 |
| 17 | 11001 | 10001 | 11110 | 10100 | 11000 | 10000 | 11111 | 10101 | 11001 |
| 18 | 11011 | 10010 | 11100 | 10111 | 11010 | 10011 | 11101 | 10110 | 11011 |
| 19 | 11010 | 10011 | 11101 | 10110 | 11011 | 10010 | 11100 | 10111 | 11010 |
| 20 | 11110 | 10100 | 11000 | 10000 | 11111 | 10101 | 11001 | 10001 | 11110 |
| 21 | 11111 | 10101 | 11001 | 10001 | 11110 | 10100 | 11000 | 10000 | 11111 |
| 22 | 11101 | 10110 | 11011 | 10010 | 11100 | 10111 | 11010 | 10011 | 11101 |
| 23 | 11100 | 10111 | 11010 | 10011 | 11101 | 10110 | 11011 | 10010 | 11100 |
| 24 | 10100 | 11000 | 10000 | 11111 | 10101 | 11001 | 10001 | 11110 | 10100 |
| 25 | 10101 | 11001 | 10001 | 11110 | 10100 | 11000 | 10000 | 11111 | 10101 |
| 26 | 10111 | 11010 | 10011 | 11101 | 10110 | 11011 | 10010 | 11100 | 10111 |
| 27 | 10110 | 11011 | 10010 | 11100 | 10111 | 11010 | 10011 | 11101 | 10110 |
| 28 | 10010 | 11100 | 10111 | 11010 | 10011 | 11101 | 10110 | 11011 | 10010 |
| 29 | 10011 | 11101 | 10110 | 11011 | 10010 | 11100 | 10111 | 11010 | 10011 |
| 30 | 10001 | 11110 | 10100 | 11000 | 10000 | 11111 | 10101 | 11001 | 10001 |
| 31 | 10000 | 11111 | 10101 | 11001 | 10001 | 11110 | 10100 | 11000 | 10000 |

INVENTOR
D. W. KOHS
BY Harry C. Hart
ATTORNEY 2,858,530
Patented Oct. 28, 1958

2,858,530

CONVERSION OF BINARY CODE TO REFLECTED CODE

Dwight W. Kohs, Las Cruces, N. Mex., assignor to Bell Telephone Laboratories, Incorporated, New York, N. Y., a corporation of New York Original application November 5, 1953, Serial No. 390,400. Divided and this application August 18, 1954, Serial No. 450,572

10 Claims. (Cl. 340—347)

This application is a division of application Serial No. 390,400, filed November 5, 1953, now matured into Patent 2,852,745, granted September 16, 1958.

This invention relates to the treatment of information-bearing codes and particularly 2-valued codes. It has for its principal object the conversion of one such code into any of a number of other such codes by a simple systematic process which may be carried out with simple and inexpensive apparatus.

Of the many different ways in which information may be coded, one which offers many well known advantages is the 2-valued permutation code; i. e., the code in which each "word" comprises a sequential arrangement of "digits," each of which may have one and only one of two different values. These two values may be of any kind provided they are readily distinguishable. Thus, they may be "up" and "down" for a semaphore; "open" and "closed" for a switch; "yes" and "no" for a voice; "on" and "off" for a pulse; "1" and "0" for a printer.

Following any single systematic arrangement, a number of different words may be built up, each represented by one and only one such permutation of values. For a code of $n$ digits, there are $2^n$ such different words. One systematic arrangement by which such code words may be built up is the conventional binary arrangement, so called from its similarity to the well known binary number system. Another such systematic arrangement is that of the so-called "reflected" code. It is a significant characteristic of the reflected code, which is not shared by the binary code, that no two adjacent words differ in the values of more than one digit. This feature is of great advantage in connection with certain apparatus and processes for the generation or conversion of a signal, such as a time series of samples of a voice wave, into 2-valued code form. With the binary code small errors in the coding process may result in far larger errors in the code. With the reflected code this is impossible.

The reflected code, apparatus for generating it and apparatus both for directly decoding it and for converting it into binary code (which may thereafter be decoded by conventional apparatus) is the subject of F. Gray Patent 2,632,058.

Now it happens that systematic techniques are known for converting the binary code into the reflected code and vice versa and the necessary operations may be carried out by electrical or mechanical apparatus. For example, it is shown in Gray Patent 2,632,058 that to convert any pulse group or "word" in the reflected code into a word having the same meaning in the binary code, it is only necessary to apply the reflected code pulse group to a binary counter or flip-flop circuit and the output of the latter is without further ado the required word in the binary code. This of course assumes that the counter shall be preset to the proper condition before the initial application of pulses to it. So that the process may be repeated, Gray arranges to reset the counter to its standard or rest condition at the conclusion of each pulse group. To permit this resetting operation to take place without confusion in the code conversion Gray provides a guard space of at least a single digit length following each pulse group. The present invention improves over the code converter of the Gray Patent by eliminating the need for such guard space.

The code converter of the Gray patent requires that in each pulse group or word the digit pulse of greatest significance be the one which is first applied to the converter. An application of R. L. Carbrey, Serial No. 279,479 filed March 29, 1952, now Patent 2,755,459, granted July 17, 1956, discloses code converters which are able to convert from the reflected code to the binary code or from the binary code to the reflected code and, in each case, when the pulse order within the group is such that the first pulse applied is the most significant digit pulse or the least significant digit pulse. The operations are different in the four cases and this requires specific differences of instrumentation.

The present invention is based in part upon the discovery that many other 2-valued codes having various advantageous properties may be generated by repeating without change one or more times any specific code conversion operation, e. g., the operation carried out by the apparatus of the Gray patent, by that of any one of the four apparatus forms of the Carbrey application, or any other code converter; and that after a certain number of such repeated operations the code which formed the starting point of the process is always recovered. In particular, with any 2-valued 5-digit code, if the code form which serves as the starting point is the reflected code, a first application of the conversion operation carried out by a binary counter produces the conventional binary code, the second such operation produces another code, the third still another code, the fourth still another code, and so on to the eighth which produces the reflected code once more. Thus it is possible, starting with the binary code, to produce the reflected code by the successive application seven times of the same process which originally converted the reflected code into the binary code.

Because of this cyclical character of the pattern of repetitions of this process, it is possible to set out a subgroup of the many different $n$-digit codes as points on the circumference of a circle, each point representing a code which is derivable from its predecessor by an identical conversion process. Thus, it is possible to proceed from any point of this circle to any other point by advancing always in the same direction. Under some circumstances, due to limitations of available apparatus or otherwise, this possibility which permits the employment of apparatus of the same type for any conversion of the subgroup may offer substantial advantages.

Of the many different forms which the 2-valued $n$-digit code may take, the remaining ones may be arranged in additional circles such that starting with the code represented by one point of such circle, successive application of the same conversion process generates the remaining points of that circle in order, returning after a certain number (in the 5-digit code, eight) of operations to the starting point.

While the various codes of these several circles and the conversions among the codes of each circle are within the contemplation of the invention, it is of particular significance that one such circular arrangement and only one of them contains both the conventional binary code and the reflected code; i. e., the two codes of chief importance in the present state of the coding art. It is also of significance that, in this principal circle, these two codes lie immediately adjacent to each other on its periphery so that the conversion from one to the other is carried out in a single step while the opposite conversion may be carried out by proceeding around the circle in the same direction for $m-1$ successive steps, where $m$ is the number of points on the circle. It is found that $m$ is always equal to or greater than $n$ but always less than $2^n$. More specifically, it is equal to the lowest integral power of 2 that is equal to or greater than $n$.

The invention also provides a simplified apparatus and method for proceeding directly and in a single step from the binary code to the reflected code and, by a repetition of the same operation $m-1$ times, returning to the binary code. In other words, the invention provides an improved method and apparatus for progressing around the circle in the reverse direction. This progress may of course start at any point of the circle, proceed as far as may be desired, or, if repeated $m$ times, return to its starting point. The same operations and the same progress may of course be applied to the codes of any one of the other circles which, taken all together, contain $2^n!$ different codes.

The invention will be fully apprehended from the following detailed description of preferred embodiments thereof taken in connection with the appended drawings, in which:

Fig. 6 is a tabulation showing the various related forms of a 5-digit 2-valued code;

Figure 1:
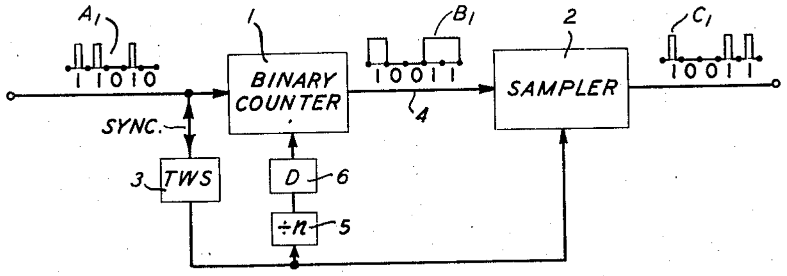
Fig. 1 is a schematic block diagram showing a simplified code converter of the prior art.

Referring now to the drawings, Fig. 1 shows the code converter of the Gray patent reduced to block diagram form. Its essential element is a binary counter 1 which is also known as a scale-of-two circuit. As stated in the Gray patent, it may comprise a pair of triodes in which the anode of each is connected by a direct current path to the control grid of the other. Appropriate biases are applied to the electrodes in conventional fashion. Such a circuit has two stable rest conditions in each of which one tube is conductive while the other is not. On the application of a pulse to the grids of both tubes, the condition is reversed and remains reversed until the application of the next pulse, whereupon the circuit returns again to the first condition. Thus, for an incoming pulse wave form as indicated at $A_1$, the output wave form, namely that of the potential of the anode of one of the tubes of the binary counter, is as indicated at $B_1$.

It is characteristic of such a device that on its output conductor each pulse is stretched along the time scale to merge with the following pulse. Thus, for example, the potential does not fall between the last two pulses of the train. It is a simple matter, however, to convert the wave form $B_1$ into one in which each pulse is clearly distinguishable from its neighbors. To this end, Gray includes a sampler 2 to which the wave form $B_1$ is applied along with a timing wave derived from a timing wave source 3 which is synchronized with the incoming pulse train. It operates to take brief samples of the wave form $B_1$ and so deliver a train of readily distinguishable individual pulses as shown at $C_1$.

The code conversion operation carried out by the binary counter 1 will be described by way of an example in the 5-digit code in which the particular pulse group or word to be converted is 11010 as indicated at $A_1$ above the figure. Assuming the binary counter to be in its first state, e. g., the state of least output current, the first pulse to reach it shifts it to its second stage, e. g., the state of most output current, thus producing a pulse on the output conductor 4. The second incoming pulse shifts it back again to the first state. The third digit position contains no pulse so that the output remains in the first state. The next incoming pulse, which is in the fourth digit position, shifts the counter again to the second state where it then remains throughout the remainder of the word and thereafter until somehow restored.

It is explained in Gray Patent 2,632,058 that when the pulses thus applied to the bistable counter 1 are arranged in accordance with the reflected 2-valued code, the output of the counter consists of a group of pulses which are arranged in accordance with the conventional binary code. In order to prepare the system to receive the next incoming code pulse group, Gray makes provision for resetting the counter to its original condition or first state. This provision is illustrated in Fig. 1 by the addition of a frequency divider 5 and a delay equalizer 6, whose mode of operation is obvious. The resetting operation requires time so that with the Gray system a guard space must be provided following each code pulse group to be converted in which the resetting operation may take place.

Figure 2:
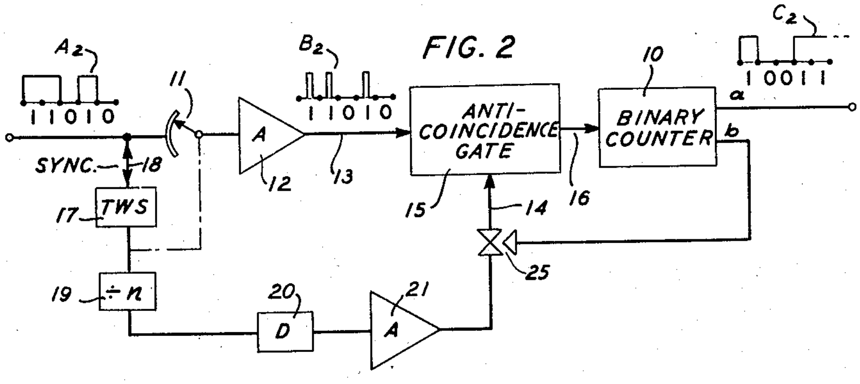
Fig. 2 is a schematic block diagram illustrating an improvement on the code converter of Fig. 1.

In accordance with a feature of the present invention the need for this guard space or interval is dispensed with. Referring now to Fig. 2 which illustrates this feature, the essential element is a binary counter 10 as before. Because as a matter of engineering practice pulses which fully occupy their respective digit positions are more common than brief pulses centered in their digit positions, the improvement is illustrated in connection with such a pulse train. It is shown at $A_2$ above the drawing and represents the word 11010 as before. However, the binary counter 10 requires at its input terminals individually separated pulses. To narrow down the individual pulses of the wave form $A_2$ without changing the word, a sampler is provided. For the sake of simplicity of illustration, this sampler is shown as a mechanical commutator 11, although as a practical matter it is preferred to employ electronic circuit elements such, for example, as the triple diode gate described in Meacham Patent 2,576,026. The sampler output passes through a buffer amplifier 12, included to provide gain and isolation, and is applied to one of the two input terminals 13, 14 of a circuit element 15 which is variously known in the art as a disparity recognizer, a Not-And circuit, and an anticoincidence gate. While the apparatus may have many different forms, a preferred one is that disclosed in Hussey Patent 2,636,133 for the reason that it is relatively insensitive to minor spurious departures from exact time coincidence of pulses which are applied to its two input points and which are nominally in time coincidence. The output terminal of the anticoincidence gate 15 is connected to the input terminal 16 of the binary counter. Disregarding, for the present, the possibility of the application of a pulse to the second input point 14 of the anticoincidence gate 15, the input word, in the form of the narrow pulses $B_2$, passes through the gate to the counter which converts it into the output word in the form of stretched pulses $C_2$ exactly as in the case of Fig. 1.

The sampler 11 is driven by suitable means coupled to the output of a basic timing wave source 17 which may be an oscillator tuned approximately to the frequency of the basic pulse repetition rate and including nonlinear elements such that it may readily be brought into exact synchronism therewith by a synchronizing conductor.

The output of the timing wave source 17 is also applied to a frequency divider 19 which divides its pulse rate by a number $n$, namely, the number of digits in each pulse group. The latter may conveniently comprise a relaxation oscillator adjusted to run freely at a frequency slightly lower than the *n*th submultiple of the basic pulse rate. It is then tripped in well known fashion by the last pulse of each group of *n* delivered by the basic timing wave source 17.

The output of the frequency divider 19 thus consists of a sequence of pulses recurring at the word or pulse group rate. These pulses are brought into exact time coincidence with the first pulse of each incoming group by the interposition of a delay equalizer 20. A buffer 21 may be included to equalize the amplitudes of the pulses of this train with the amplitudes of the pulses of the incoming train.

Binary counters in general, and the binary counters 1 and 10 of Figs. 1 and 2 in particular, contain two output leads which are connected together only by way of a high impedance path. As the counter 10 shifts from one of its two stable states to the other, the potential conditions of these two output leads are interchanged. In Fig. 2 one of these two leads *a* is taken as the principal output lead and the converted code group appears as a voltage thereon. The other output lead, labeled *b*, extends to the control terminal of a switch 25 whose two conduction terminals are connected respectively to one input point 14 of the anticoincidence gate 15 and to the buffer amplifier 21. This switch 25, which as a practical matter may be an electronic device, is conventionally shown as comprising two arrowheads whose points are in contact with each other and a third arrowhead which is separated from the first two. This convention indicates that the path from the buffer 21 to the second input point 14 of the anticoincidence gate 15 is normally closed and is opened upon the application to the third arrowhead of an inhibiting pulse derived from the *b* output lead of the binary counter 10.

The operation takes place in the following fashion. Suppose, first, that the last digit of the code group currently being converted is 0 and that the first digit of the following group is also 0. Under these conditions no pulse appears on the *a* output lead of the counter but an inhibiting pulse appears on the *b* output lead and acts to disestablish the path from the buffer 21 to the anticoincidence gate 15 so that the group frequency pulse generated by the divider 19 which appears at this instant cannot reach the gate. The gate 15 thus receives no pulse on either of its input points and so delivers no pulse to the binary counter. The binary counter 10 thus remains in its first condition as required.

Suppose, next, that the last digit of the current group is again 0 and that the first pulse of the next incoming group is 1. As before, the path from the buffer 21 to the gate 15 is disestablished. Now, however, the first incoming pulse of the following group passes through the gate 15 and trips the binary counter 10 into its second condition as required.

Thirdly, suppose that the last digit of the currently converted group is a "1" and that the first digit of the following group is also a "1." Under these conditions the binary counter 10 is in its second state and delivers no inhibiting pulse to the switch 25. Therefore, the path from the buffer 21 to the gate 15 remains established and the group frequency pulse from the divider 19 reaches the gate 15 in time coincidence with the first pulse of the following group. Since both input pulses to the gate 15 are present, it delivers no output and the binary counter 10 remains in its second state as required.

Lastly, suppose the last digit of the current converted group is 1 and the first digit of the following incoming group is 0. As before, no inhibiting pulse is applied to the switch 25 and the path for the group frequency pulses from the divider 19 remains established. There being no pulse in the first digit position of the next incoming group, this group frequency pulse passes through the gate 15 and trips the binary counter 10 back to its first state as required. Thus the apparatus of Fig. 1 operates to convert an incoming group of 2-valued pulses arranged in one code form into an outgoing group arranged in a specifically different code form, and without the need for the provision of any guard space or interval between successive pulse groups.

As stated above, the conversion of form which is thus applied to the incoming pulse group is such that if the incoming pulse group is in the so-called reflected form, the outgoing pulse group is in the conventional binary form. In accordance with another feature of the invention, the same conversion may be applied again to the pulse group which appears on the output lead of the binary counter of Fig. 1 or of Fig. 2. This conversion may be carried out with apparatus which is a duplicate of that of either of those figures, or with any other apparatus which carries out such a code conversion operation. Indeed, these operations may be repeated as often as may be desired. Applicant has discovered, however, that a certain number of repetitions invariably brings the code pulse group back to its original form. The number of repetitions after which this happens is equal to the lowest integral power of 2 which is equal to or greater than the number *n* of digits in the code. Thus, for a 1-digit code, 2 conversions; for a 3-digit code or a 4-digit code, 4 conversions; for a code having 5, 6, 7 or 8 digits, 8 conversions; for a code having any number of digits from 9 to 16, 16 conversions; for a code having 17 . . . 32 digits, 32 conversions, and so on.

Figure 5:
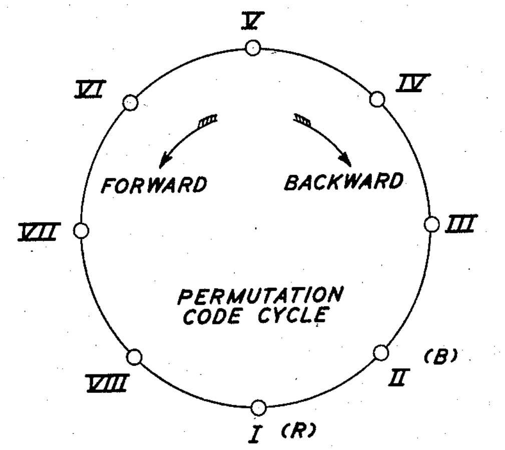
Fig. 5 is a diagram illustrating a feature of the invention.

Because of the cyclic nature of the code conversion sequence, it is possible to represent all of the codes which are thus derivable from each other as points on a circle. Fig. 5 illustrates this situation for the 5-digit code in which, as explained above, the result of eight such conversion operations has the same form as the original input. By way of illustration, one point on this circle, denoted R, may represent the reflected code. As explained above, a single conversion of the type carried out by the apparatus of Fig. 1 or Fig. 2 produces the conventional binary code. Another conversion of the same sort produces a 5-digit 2-valued code which is neither reflected nor binary but is different from either of them. This code, furthermore, has the interesting property that the two pulse groups lying immediately on either side of the center line which divides the lower half of the scale from the upper half contain fairly large numbers of pulses. Specifically, in the 5-digit code which covers the numbers from 0 to 31 the center line lies between the code for the number 15 and that for the number 16. In the code denoted III, the number 15 is written 01010 while the number 16 is written 11111. This property of any code is known to be of advantage in the transmission of information because the occasions when the amplitude of the signal being transmitted is small are those when it is most important that the signal not be masked by noise and because, too, in the case of a self-timed regenerative repeater, a repetition of digit pulses 70 percent of the time, as here, provides insurance that synchronism shall not be lost.

The remaining five points on the circle of Fig. 5 represent the various other codes, each of which is derivable by the application of the present code conversion operation to its predecessor.

All of these codes are set out in Fig. 6.

Figure 3:
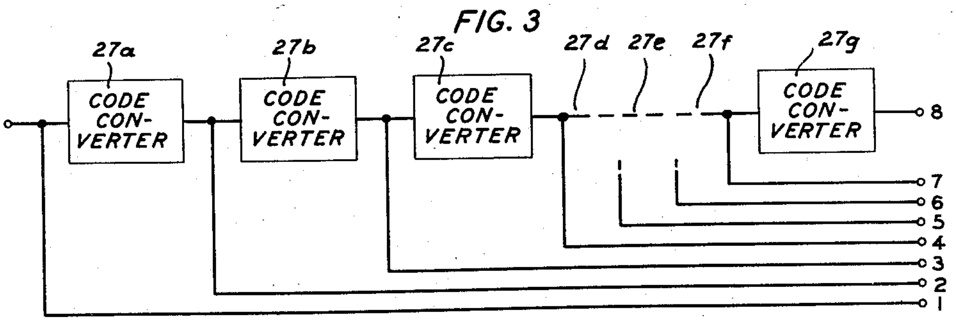
Fig. 3 is a schematic block diagram showing a plurality of like code converters connected together in tandem.

The successive operations may be carried out by the connection of code converters in tandem in the fashion shown in Fig. 3 wherein four such converters, **27*a*, 27*b*, 27*c* and 27*g*, are actually shown and three more are indicated. This arrangement thus carries out seven successive code conversions. The first converted form, denoted form II in Fig. 6, appears on a tap at the output point of the first converter 27*a*, the second, denoted III, on a tap at the output point of the second converter 27*b***, and so on. This arrangement is therefore capable of delivering any one of eight different codes for a given code input. If the input code is a 5-, 6-, 7- or 8-digit code, the set of eight is a complete set by which is meant that the addition of an eighth converter in tandem with the seventh would produce an output which is identical with the input to the first converter. If, still more specifically, the input to the first converter is a 5-digit 2-valued code in the reflected form, the outputs which appear on the several taps are in the respective code forms shown in Fig. 6.

Figure 4:
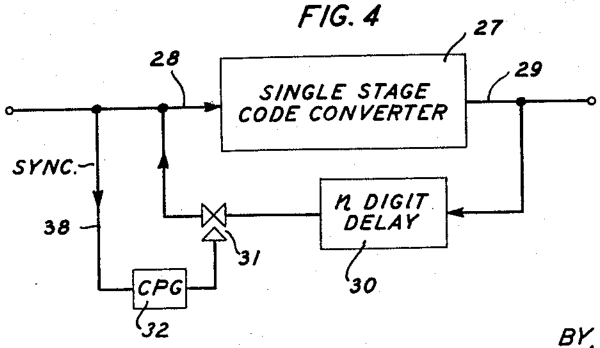
Fig. 4 shows a variant of Fig. 1 in which successive conversion operations are carried out by a single code converter.

Provided the incoming pulse groups or words to be converted are separated in time by sufficiently long intervals, the repeated code conversions carried out by the apparatus of Fig. 3 may equally well be carried out with a single converter, appropriately recycled. Fig. 4 is a block schematic diagram of a suitable system. A single converter 27 is provided which may be the same as that of Fig. 1, of Fig. 2, any of those shown in the aforementioned Carbrey application or, indeed, any converter which carries out an unequivocal conversion of a code pulse group in one form to another form. For a single conversion, the incoming code pulse group or word is applied to its input point 28 and the resulting converted code word appears at its output point 29. To repeat this conversion the output pulse group is fed back to the input point by way of a feedback path which includes a delay unit 30 proportioned to introduce a delay of $n$ digits or pulse positions; i. e., a delay of a whole word in code form. The first output pulse train thus delayed and applied to the input point of the code converter is again converted, and the result of this second conversion process appears at the output point where it may be recycled again after a one word delay, and so on as many times as desired. The successive converted code words appear in time sequence at the output point 29 and may be sorted out from each other and delivered to their various intended destinations by conventional time division distributor techniques. In order to prevent indefinite repetition of the recycling process, the feedback path should be disabled after an appropriate time; i. e., after a time sufficient to permit the generation of whichever one of the converted codes is the last one desired. The disabling may be carried out by conventional electronic techniques, here indicated for the sake of simplicity of illustration by a switch 31 comprising two opposed arrowheads in the conduction path and a third arrowhead separated from the first two to which an inhibiting pulse is applied at the proper time and throughout the proper time interval. This interval is that during which the incoming code groups are applied at the input to the converter. Such an inhibiting pulse may be derived from any suitable apparatus, here indicated as a control pulse generator 32 which is maintained in synchronism with the incoming pulse group train by a conductor 38.

Two-valued codes may be constructed in a very large number of forms. Indeed, this number may be shown to be $2^n!$. Thus, in the 5-digit code the number of possible forms is $2^5!=32!=32\times31\times30 \ldots 3\times2\times1$. The circle of Fig. 5 includes only a comparatively small subgroup of this large number. However, another circle similar to that of Fig. 5 may be constructed containing another sub-group of eight such codes and the conversion process of the present invention may be applied to any one of these any number of times up to eight to give the various other members of the subgroup.

Some of the codes lying on these other circles offer various advantages. Thus the codes which are the safest, from the standpoint of interference in transmission with signals of low amplitude are those for which the code words lying on either side of the center line comprise an unbroken sequence of 1's for one of these words and a sequence containing a single zero for the other. In the 5-digit code, this makes for pulses 90 percent of the time for low amplitude signals.

Another code, likewise not a member of the subgroup illustrated in Figs. 5 and 6, is that disclosed in Ville et al. Patent 2,646,548. It is a peculiarly simple one to generate. It is by no means simple to decode, but it is believed that the decoding of one of its derivatives, in the sense of the present invention, may be simple.

Figure 7:
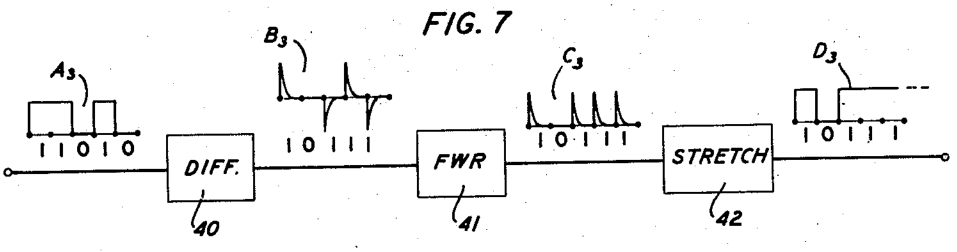
Fig. 7 is a block diagram of apparatus for carrying out a code conversion operation which is inverse to that carried out by Fig. 1.

With the code converter apparatus of Fig. 1 or Fig. 2 or with any other apparatus which is equivalent thereto in the sense that it carries out the same operations on an incoming code pulse group (specifically, converts reflected code to binary code), the progress around the circle of Fig. 5 is counterclockwise as indicated by the lower arrow. Similarly, the progress through the successive columns of the tabulation of Fig. 6 is from left to right. By the application of a different conversion it is possible to proceed across the tabulation of Fig. 6 from right to left and around the circle of Fig. 5 in a clockwise direction. Such different conversion is carried out in principle by the tandem combination of a differentiating circuit 40 and a full wave rectifier 41 as shown in Fig. 7. The operation of this combination will be explained by way of an illustration in which a 5-digit 2-valued pulse group as indicated above the figure has values 11010 for the successive digits. In the ordinary case, as illustrated at $A_3$ above the figure, adjacent pulses in successive digit positions are merged together so that the wave form does not fall to zero between the first two pulses but rather holds over.

The differentiator 40 responds with a positive pulse to every positive-going change in the condition on the input lead and with a negative pulse to every negative-going change. At the output of the differentiator 40, therefore, there appears the wave form denoted $B_3$ above the figure. The full wave rectifier 41 operates to reverse the polarity of each negative pulse, leaving the positive pulses unchanged so that the wave form after such full wave rectification is as given in the curve $C_3$ above the figure. This represents the digit sequency 10111. It appears from the table of Fig. 6 that the incoming pulse group 11010 stands in the conventional binary code for the number 26. As explained above, a pulse group of this form is converted by this apparatus combination into the group 10111 and this appears, again from the table of Fig. 6, to represent the same number 26 in the reflected code. In other words, it has progressed one step around the circle of Fig. 5 in the clockwise direction.

In order that duplicate apparatus may be able to operate in the same way on the new pulse group wave form $C_3$, each pulse of the latter is preferably stretched out to occupy a full pulse position or digit space as indicated in curve $D_3$. This stretching apparatus 42 may conveniently comprise a single trip multivibrator to whose output terminal there is connected a delay line, whose far end is open circuited, and of a length proportioned to introduce a delay of one half of a digit pulse interval in one round trip of a signal from its input terminal to its open circuited end and back. The single trip multivibrator may be of conventional construction, having a first unconditionally stable state and a second quasistable state. The elements of the multivibrator are preferably so proportioned that its relaxation time is also equal to one half of the time allotted to a digit pulse. As is well known in the art, such apparatus returns from its quasistable state to its unconditionally stable state after the lapse of this interval for which it has been adjusted. But at this instant the delayed replica of its output pulse returns, after reflection at the far end of the delay line, and serves to fill in the second half of the pulse position assigned to the digit in question. From the standpoint of the output circuit, the pulse has been stretched to occupy the full digit interval. But during this second half digit interval, the single trip multivibrator has time to recover and become stabilized in its first condition and be in readiness to operate in similar fashion on the next pulse. A pulse stretcher of this character is described in an article by L. A. Meacham and E. Peterson published in the Bell System Technical Journal for January, 1948, vol. 27, page 1.

The values assigned to the various groups of input pulses are of no consequence to the apparatus. In the example discussed above the input pulse group 11010 was taken as representing the number 26 in the conventional binary code. It might equally well represent the number 29 in the code of column VIII of the tabulation of Fig. 6 or the number 18 of column V. Reference to the tabulation will show that the apparatus of Fig. 7 converts it into the code standing for the number 29 in column VII or the number 18 in column IV. Indeed, the tabulation contains eight such examples. The same holds for any other 5-digit pulse group and for all of the 5-digit pulse groups of any one column. Thus the apparatus of Fig. 7 carries out operations which may be described as progressing in the clockwise direction around the circle of Fig. 5 or from right to left in the tabulation of Fig. 6.

Figure 8:
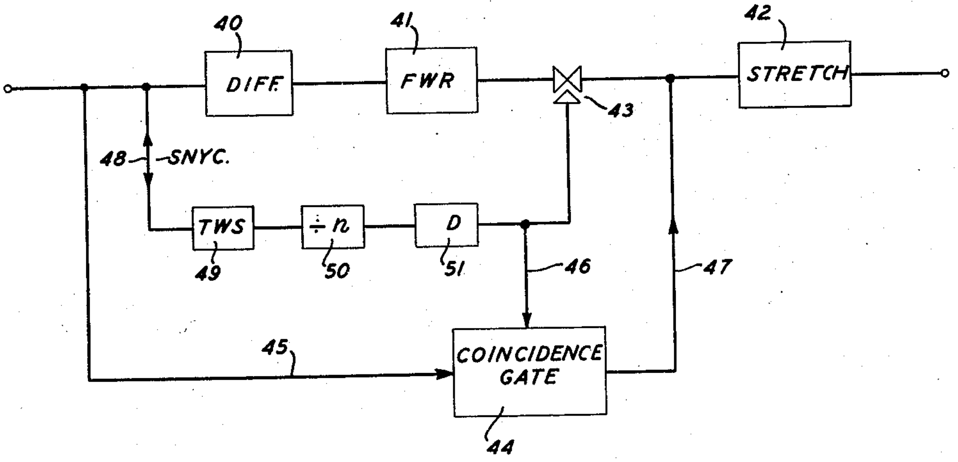
Fig. 8 is a schematic block diagram showing a modification of the apparatus of Fig. 7.

Since the wave form of the output of the stretcher 42 of Fig. 7 returns always to the same condition, represented in curve $D_3$ as the zero value, either a guard interval must be provided following each group to allow this return to take place or the apparatus, unless supplemented, will make errors in some of the code conversions. Fig. 8 shows a modification of the simple converter of Fig. 7 which provides against both of these contingencies. In addition to the differentiator 40, the full wave rectifier 41 and the stretcher 42 of Fig. 7, a controllable switch 43 is inserted in tandem between the rectifier 41 and the stretcher 42. A coincidence gate 44 having two input terminals 45, 46 and one output terminal 47 is provided. Its output terminal 47 is connected to the input terminal of the stretcher 42.

One of its input terminals 45 is connected to the input point of the differentiator 40. The input point of the apparatus as a whole is connected by way of a synchronizing path 48 as in the case of Fig. 2 to a timing wave source 49 which feeds a frequency divider 50, the output of which is applied by way of a delay equalizer 51 to the second input point 46 of the coincidence gate 44 and also to the control terminal of the switch 43. The divider 50 derives from the output of the timing wave source 49 a train of pulses which occur at the group frequency. As in the case of the system of Fig. 2, the delay equalizer 51 is proportioned to bring the successive pulses of this train into time coincidence with the first digit pulse of each incoming group. As before, the switch 43 is shown by a convention in the illustration which indicates that a pulse applied to its control terminal disables the path from the full wave rectifier 41 to the stretcher 42, this path being otherwise established. With this arrangement, pulses from the full wave rectifier 41 reach the stretcher 42 during all digit intervals except the first of each group, this first digit being always inhibited by the opening of the switch 43 under control of one of the group frequency pulses.

For the rest, the operation of this circuit will be understood from an examination of four possible situations. Suppose, first, that the last digit of the current group has the value 0 and the first digit of the next group also has the value 0. The coincidence gate 44 receives an input at its second point 46 but none at its first point 45 and so delivers no output. Thus the stretcher 42 receives no input pulse, either from the full wave rectifier 41 or from the coincidence gate 44, and it remains in its 0 condition as required.

Suppose, next, that the last digit of the current group is 0 and the first digit of the following group is 1. The switch 43 is opened by the group frequency pulse as before. This group frequency pulse is applied to the coincidence gate 44 at the same time as the first pulse of the following group. Since these two are present together, the coincidence gate 44 delivers a pulse to the stretcher 42 which trips it to its 1 condition as required.

Third, suppose that the last digit of the current group is 1 and the first digit of the following group is also 1. The stretcher 42 is in its 1 condition. The group frequency pulse which coincides in time with the first pulse of the following group opens the switch 43 and, coinciding in time with the first pulse of the following group, actuates the coincidence gate 44 to deliver an output pulse to the stretcher 42. This holds the stretcher in its 1 condition for at least the time allotted to one more digit as required.

Lastly, suppose that the last digit of the current group is 1 and the first digit of the following group is 0. The stretcher 42 is now in its 1 condition. When the group frequency pulse arrives it operates to open the switch 43 and is also applied to one input terminal 46 of the coincidence gate 44. This gate, however, receives no signal at its other input point 45 and therefore delivers no output pulse. The stretcher 42 therefore receives no input signal from any source and falls after a single digit interval to its 0 value as required.

Returning to the tabulation of Fig. 6, it has been shown that each column of this tabulation is a representation in written or printed form of the effect of carrying out a specified operation on an adjacent column. In proceeding from left to right across the table, the operation is one which, provided the word to be translated is in the form of a pulse group, may be carried out by a binary counter and sampler or the equivalent. In proceeding from right to left across the table and with the same proviso, the operation is one which may be carried out by the combination of a differentiator, a full wave rectifier and a stretcher or the equivalent. It is possible, however, by examining the tabulation to arrive at rules for converting any entry of the table in the form of a printed word into any entry of the same meaning in an adjacent column without the intermediate steps of first translating the printed word into a pulse group and, after conversion by the apparatus into the new code, retranslating the converted pulse group into the printed form.

These rules are given below for conversion from reflected code to binary code (left to right across the table or forward) and for binary code to reflected code (right to left across the table or backward), respectively. Since it has already been shown that the successive code conversions by the apparatus of the invention, progressing around the circle of Fig. 5 in any single direction, are alike, it follows that there is no loss of generality in the exposition of these rules for the first and second columns of the table.

A. Rule for conversion from reflected code (R) to binary code (B)

*Step 1.*—Copy most significant digit of R as first digit of B.

*Step 2.*—Compare first digit of B with next digit of R.

*a.* If they are alike, write 0 for the second digit of B.

*b.* If they differ, write 1 for the second digit of B.

*Step 3.*—Repeat step 2 for each succeeding digit of R.

B. Rule for conversion from binary code (B) to reflected code (R)

*Step 1.*—Copy most significant digit of B as first digit of R.

*Step 2.*—Compare first digit of B with next digit of B.

*a.* If they are alike, write 0 for the second digit of R.

*b.* If they differ, write 1 for the second digit of R.

*Step 3.*—Repeat step 2 for each succeeding digit of B.

A significant feature which is common to both of these rules is that a single symbol is written for each digit of the converted group as determined by a comparison of the values of two digits. In the one case (forward), the comparison is made between a digit of the converted group and a digit of the group to be converted. In the other case (backward) the comparison is between adjacent digits of the word to be converted.

Other code conversion rules can be constructed. For example, in the case of each of the foregoing rules, the comparison is between the values of adjacently placed digits, of the same word or of different words. A conversion rule could be constructed in which nonadjacent digits are compared, whether of the word to be converted or as between the word to be converted and the converted word. Moreover, as a result of such comparison, the next converted digit written down may be either 0 or 1. Again, it is possible to construct still more elaborate code conversion rules in which, for example, a double comparison is made between three or more digits, and so on. Each such conversion rule leads from any code word to another code word having the same meaning in different 2-valued code form.

It is possible in principle to construct apparatus which will carry out the operations indicated by any such rule and so to construct corresponding new codes by automatic means. That the converters described above carry out the operations indicated in the foregoing rules, and especially that each of them constructs a digit of the converted code as a result of a comparison of two other digits, is clear from the following considerations. Considering first the forward conversion carried out by the binary counter 1 or 10 of Figs. 1 and 2, it has been shown above that this element has two stable states and that each of these states is shifted to the other state or not in dependence on the value of an input digit. But its current state itself was reached under the action of the value of a prior digit. Therefore the output digit is in effect the result of a comparison by the binary counter of a prior digit of the converted code, represented by its current state, and a later digit of the code to be converted, represented by its input digit.

The backward converter of Figs. 7 and 8 likewise embodies this dual input principle and perhaps even more clearly. The differentiator 40 is named from the fact that it responds to a change in the electrical condition at its input point. It might perhaps more accurately be denoted a "differencer." It perfectly reflects the mathematical procedure known as "taking finite differences"; and the differences which it takes are those which exist as between the values of the successive digits of the word to be converted, as represented by the input pulses and spaces.

The invention, which has been described in connection with illustrative examples embodying two different code conversions, is applicable as well to any of a large number of different code conversions and to the apparatus which carries them out, especially when any such conversion operation is repeated.

What is claimed is:

1. Apparatus for converting a first code sequence of $n$ 2-valued digit pulses representting a word in the conventional binary code into a different code sequence of $n$ 2-valued digit pulses representing the same word in the reflected binary code which comprises a differentiator having an input terminal and a full wave rectifier having an output terminal connected together in tandem, means for applying said first pulse sequence to the input terminal of said differentiator, and a pulse stretcher connected to the output terminal of said full wave rectifier, said stretcher being proportioned to prolong each pulse output of said full wave rectifier to the full time allotted to the digit which it represents.

2. Apparatus for converting each of a succession of incoming code sequences of $n$ 2-valued pulses arranged in accordance with the binary code into a different code sequence of $n$ 2-valued pulses arranged in accordance with the reflected code, which comprises a differentiator having an input terminal, a full wave rectifier, a normally closed controllable switch and a pulse stretcher having an input terminal and an output terminal, all connected together in the order named, a coincidence gate having two input terminals and an output terminal, a connection from the input terminal of the differentiator to the first input terminal of the gate, a connection from the output terminal of the gate to the input terminal of the stretcher, means for applying said incoming code pulse sequences to the input terminal of the differentiator, means for deriving from said input code pulse sequences an auxiliary sequence of pulses which recur at the code group frequency, means for adjusting the pulses of said auxiliary sequence to coincide in time with the first digits of the successive incoming code pulse sequences, means for applying said auxiliary pulses to the second input terminal of said coincidence gate, and means for also applying each of said auxiliary pulses to open said switch, whereby said successive incoming code sequences may follow one another at the first input terminal of said gate without the interposition of any guard interval between said incoming code sequences.

3. Apparatus for converting each of a succession of incoming code sequences of $n$ 2-valued pulses arranged in accordance with the reflected code into a different code sequence of $n$ 2-valued pulses arranged in accordance with the binary code, which comprises an anticoincidence gate having two input terminals and an output terminal, a binary counter having an input terminal and two output terminals, a connection from the output terminal of the gate to the input terminal of the counter, means for applying the pulses of each said reflected code sequence to the first input terminal of said gate, means for generating an auxiliary pulse sequence of word frequency, means for applying the pulses of said auxiliary sequence to the second input terminal of said gate by way of a controllable switch which is normally closed, means for adjusting the recurrence instants of the pulses of said auxiliary sequence to coincide with the first digit of each incoming code sequence, and means controlled by the second output terminal of said binary counter for opening said switch when the signal on the first binary counter output terminal is of one value and for leaving said switch closed when the signal on said first-named output terminal is of another value, whereby said successive incoming code sequences may follow one another at the first input terminal of said gate without the interposition of any guard interval between said incoming code sequences.

4. Apparatus for converting a first code sequence of $n$ 2-valued digit pulses representing a word in the binary code into a different code sequence of $n$ 2-valued digit pulses representing the same word in the reflected code which comprises a differentiator, a full wave rectifier and a pulse stretcher connected together in tandem in the order named, said differentiator having an input terminal, said pulse stretcher having an output terminal, means for applying said first code pulse sequence to said input terminal, and means connected to said output terminal for withdrawing said different code pulse sequence.

5. Apparatus for converting a code sequence of $n$ 2-valued pulses into a different code sequence of $n$ 2-valued pulses which comprises a plurality of like code converters connected together in tandem, each of said converters comprising a differentiator and a full wave rectifier connected together in tandem in the other named.

6. Apparatus for converting a code sequence of $n$ 2-valued pulses into a different code sequence of $n$ 2-valued pulses which comprises a plurality of like code converters connected together in tandem, each of said converters comprising a differentiator, a full wave rectifier and a pulse stretcher connected together in tandem in the order named.

7. Apparatus for converting a code sequence of $n$ 2-valued pulses into a different code sequence of $n$ 2-valued pulses which comprises a differentiator having an input point and a full wave rectifier having an output point connected together in tandem in the order named, means for applying the first code sequence to said input point, connections for deriving a converted code sequence from said output point, and means for recycling the converted code sequence through said differentiator and rectifier.

8. Apparatus for converting a code sequence of $n$ 2-valued pulses into a different code sequence of $n$ 2-valued pulses which comprises a differentiator having an input point and a full wave rectifier having an output point connected together in tandem in the order named, means for applying the first code sequence to said input point, connections for deriving a converted code sequence from said output point, means for recycling the converted code sequence through said differentiator and rectifier, and a pulse stretcher connected to the output point of said rectifier.

9. Apparatus for converting a code sequence of $n$ 2-valued pulses into a different code sequence of $n$ 2-valued pulses which comprises a code converter having an input point and an output point, a feedback path coupling said output point to said input point, said path including a delay device proportioned to retard the feedback signals by the time occupied by said pulse sequence, and means for disabling said feedback path upon the completion of a preassigned number of round trips around the loop comprising said code converter and said delay device, said converter comprising a differentiator and a full wave rectifier connected together in tandem in the order named.

10. Apparatus for converting a code sequence of $n$ 2-valued pulses into a different code sequence of $n$ 2-valued pulses which comprises a code converter having an input point and an output point, a feedback path coupling said output point to said input point, said path including a delay device proportioned to retard the feedback signals by the time occupied by said pulse sequence, and means for disabling said feedback path upon the completion of a preassigned number of round trips around the loop comprising said code converter and said delay device, said converter comprising a differentiator and a full wave rectifier connected together in tandem in the order named and a pulse stretcher connected to the output point of said rectifier.

References Cited in the file of this patent

UNITED STATES PATENTS

| | | |
|---|---|---|
| 2,320,963 | Wrathall | June 1, 1943 |
| 2,569,927 | Gloess et al. | Oct. 2, 1951 |
| 2,613,272 | Terry et al. | Oct. 7, 1952 |